US011043806B2

(12) United States Patent
Dendas et al.

(10) Patent No.: US 11,043,806 B2
(45) Date of Patent: Jun. 22, 2021

(54) DC LOW VOLTAGE POWER DISTRIBUTION UNIT AND SYSTEM FOR A POWER GRID

(71) Applicant: TE Connectivity Nederland BV, s'Hertogenbosch (NL)

(72) Inventors: Freddy Jean Philip Dendas, Genk (BE); Mark Vermeulen, Nuenen (NL)

(73) Assignee: TE Connectivity Nederland BV, S'Hertogenbosch (NL)

( * ) Notice: Subject to any disclaimer, the term of this patent is extended or adjusted under 35 U.S.C. 154(b) by 401 days.

(21) Appl. No.: 15/797,468

(22) Filed: Oct. 30, 2017

(65) Prior Publication Data

US 2018/0069397 A1 Mar. 8, 2018

Related U.S. Application Data

(63) Continuation of application No. PCT/EP2016/059491, filed on Apr. 28, 2016.

(30) Foreign Application Priority Data

Apr. 29, 2015 (EP) .................................... 15165574

(51) Int. Cl.
*H02J 1/00* (2006.01)
*H05B 45/37* (2020.01)
*H05B 45/50* (2020.01)

(52) U.S. Cl.
CPC ................ *H02J 1/00* (2013.01); *H05B 45/37* (2020.01); *H05B 45/50* (2020.01)

(58) Field of Classification Search
CPC .... H02J 1/00; H05B 33/0887; H05B 33/0809
See application file for complete search history.

(56) References Cited

U.S. PATENT DOCUMENTS 6,694,438 B1 * 2/2004 Porter ....................... G06F 1/26 713/300
8,436,555 B2 * 5/2013 Lo .......................... H05B 45/37 315/299

(Continued)

FOREIGN PATENT DOCUMENTS

AU 2013204215 A1 * 10/2014
AU 2013204215 A1 10/2014

(Continued)

OTHER PUBLICATIONS

PCT Notification of Transmittal of International Search Report and the Written Opinion, International Search Report and Written Opinion of the International Searching Authority, dated Jul. 12, 216, 12 pages.

(Continued)

*Primary Examiner* — Jared Fureman
*Assistant Examiner* — Michael J Warmflash
(74) *Attorney, Agent, or Firm* — Barley Snyder

(57) ABSTRACT

A DC low voltage power distribution unit for a power grid and the corresponding DC low voltage power distribution system. A DC low voltage power distribution unit has at least one input connector for connecting the power distribution unit to a DC power supply, an electric distribution circuit comprising an input line connected to said input connector, and a reference potential line. The input line branches off into a plurality of output lines. The electric distribution circuit also has current limiting means in each of the output lines, wherein a current limit value is provided by the current limiting means to limit an output power at each of the output lines to an inherently safe value. A plurality of output connectors are connected to the output lines and to the reference potential line, wherein each of the output (Continued)

connectors are configured for outputting low DC voltage to a DC load.

17 Claims, 12 Drawing Sheets

(56) References Cited

U.S. PATENT DOCUMENTS

| | | | | |
|---|---|---|---|---|
| 10,165,657 | B2 * | 12/2018 | Kelly | H05B 45/3725 |
| 2010/0244736 | A1 * | 9/2010 | Baxter | H05B 31/50 315/294 |
| 2010/0280676 | A1 * | 11/2010 | Pabon | G06F 1/266 700/295 |
| 2011/0018464 | A1 * | 1/2011 | Lo | H05B 45/325 315/294 |
| 2014/0183977 | A1 * | 7/2014 | Braunstein | H02G 3/00 307/147 |
| 2015/0021987 | A1 * | 1/2015 | Stevens | H02J 1/00 307/18 |
| 2015/0207316 | A1 * | 7/2015 | Saussele | H02J 3/383 700/287 |

FOREIGN PATENT DOCUMENTS

| | | | | |
|---|---|---|---|---|
| CN | 2086003 | U | * | 10/1991 |
| CN | 2086003 | U | | 10/1991 |
| CN | 202941009 | U | | 5/2013 |
| EP | 2846611 | A1 | | 3/2015 |

OTHER PUBLICATIONS

English translation of CN2086003U, translation dated Nov. 9, 2015, 3 pages.

PCT International Preliminary Report on Patentability and Written Opinion of the International Searching Authority, dated Oct. 31, 2017, 7 pages.

Machine translation and Abstract of CN 202 941 009 U, translation dated May 15, 2013, 3 pages.

Abstract of CN 202 941 009 U, dated May 15, 2013, 1 page.

European Patent Office Communication, App. No. 15 165 574.3-1204, dated Jul. 15, 2019, 10 pages.

* cited by examiner

DC LOW VOLTAGE POWER DISTRIBUTION UNIT AND SYSTEM FOR A POWER GRID

CROSS-REFERENCE TO RELATED APPLICATIONS

This application is a continuation of PCT International Application No. PCT/EP2016/059491 filed on Apr. 28, 2016, which claims priority to EP Patent Application No. 15165574.3 filed on Apr. 29, 2015.

FIELD OF THE INVENTION

The present invention relates to a DC low voltage power distribution unit for a power grid and to a corresponding DC low voltage power distribution system.

BACKGROUND

DC low voltage is beneficial for use in energy distribution within a building power grid, In particular, for LED lighting installations, but also for other residential installations, such as USB chargers or USB power delivery.

In the United States, conventional lighting systems are connected directly to the mains power. FIG. 1 shows a conventional power distribution system 100 for powering light emitting diodes (LED) 102 in a building. In order to connect the lighting fixtures of the LEDs 102 safely to the mains power 104, the installation must comply with the requirements of Underwriter Laboratory (UL) safety standards. Current US lighting systems, therefore, provide AC/DC converters 106 with mains insulation and an additional DC/DC converter at a ceiling or wall 108 of the building for powering the LEDs 102. Each of the AC/DC converters 106 is protected by an enclosure 110 meeting the requirements of UL safety standards.

Armored cables or cable conduits 112 connect the AC/DC converters 106 to the mains power 104. As indicated by the arrow 114, all installations behind the ceiling or wall 108 have to be performed by a qualified installer. As a consequence, the installation costs are relatively high because cable conduits essentially consist of a metal enclosure plus the wiring and the installation is performed by a qualified installer which takes up time. This concept is even used for modern LED lighting that does not necessarily have to be powered by unsafe mains voltages, but only needs low power DC voltage. As symbolized by the more narrow lines in FIG. 1, the LEDs 102 are powered by low power connections 116 which have to comply with UL class 2 (according to UL 1310, Sixth edition Aug. 26, 2011).

FIG. 2 shows a conventional power distribution system 200 as used in Europe. Here, non-armored cables are directly plugged into the mains power 204. For the distribution of mains power to AC/DC converters 206 a so-called "Wieland" connector system can be used and can be installed by any person. A qualified installer is not necessary. The LEDs 202 are connected to the output of the DC/DC converter contained in the AC/DC converter 206. Optionally, the AC/DC converter 206 outputs a safety extra low voltage (SELV), depending on the luminaire design.

Both systems as shown in FIG. 1 and FIG. 2 have the disadvantage that for each luminaire a separate AC/DC converter 206 is used. This adds to the costs and complexity of the system.

Moreover, the EMerge Alliance Occupied Space Standard proposes an integrated, open platform for power, interior infrastructures, controls, and a variety of peripheral devices to facilitate the hybrid use of AC and DC power within commercial buildings. However, in this architecture all outputs require individual power control and the complexity is, therefore, rather high.

SUMMARY

According to one aspect of the present invention, a DC low voltage power distribution unit for a power grid includes an input connector connecting the DC low voltage power distribution unit to a DC power supply and an electric distribution circuit. The electric distribution circuit has an input line connected to the input connector and a reference potential line and branches off into a plurality of output lines. The electric distribution circuit also has current limiting means in each of the output lines to limit an output power to be output at each of the output lines to an inherently safe value. This DC low voltage power distribution unit also includes a plurality of output connectors connected to the output lines and to the reference potential line. As a result, each of the output connectors outputs low DC voltage to a DC load.

According to another aspect of the present invention, a DC low voltage power distribution system for a power grid, connected to a mains voltage and having a DC low voltage power distribution unit for a power grid includes an input connector connecting the DC low voltage power distribution unit to a DC power supply and an electric distribution circuit that has an input line connected to the input connector and a reference potential line and branches off into a plurality of output lines. The electric distribution circuit further includes current limiting means in each of the output lines to limit an output power to be output at each of the output lines to an inherently safe value. The DC low voltage power distribution system further includes a plurality of output connectors connected to the output lines and to the reference potential line. As a result, each of the output connectors outputs low DC voltage to a DC load. The DC low voltage power distribution system also includes an AC/DC converter for converting a mains voltage into a safety extra low voltage SELV.

BRIEF DESCRIPTION OF THE DRAWINGS

In the following, the invention is described in more detail with reference to the attached Figures and drawings.

DETAILED DESCRIPTION OF THE EMBODIMENT(S)

The following paragraphs will describe various embodiments of the invention. For exemplary purposes only, most of the embodiments are outlined in relation to a lighting scheme as used in buildings. It should be noted that the invention may be advantageously used in building power grids, but the invention is not limited to its use in this particular exemplary application environment.

The term "UL class 1" refers to the Underwriter Laboratories (UL) Standard Power Units Other Than Class 2, UL1012, 8th edition, Nov. 9, 2010.

The term "UL class 2" refers to the Underwriter Laboratories (UL) Standard for Class 2 Power Units, UL1310, 6th edition, Aug. 26, 2011.

The term "DALI" stands for Digital Addressable Lighting Interface and is a protocol set out in the technical standard IEC 62386.

"SELV" according to IEC/EN 60950 is a safety extra low voltage. This voltage is so small that no danger due to current flowing through the human body can occur in case of direct contact, neither during rated operation nor in case of a single fault. In case of power supplies, this is achieved through electrical isolation and double or reinforced insulation between the primary side and the secondary side. Grounding on the secondary side is not required but permitted. The peak value must not exceed 42.4 V in case of AC voltages and 60 V in case of DC voltages.

In the following, several embodiments of the invention will be explained in detail. The explanations should not be understood as limiting the invention, but as mere examples of the invention's embodiments to better understand the invention. A skilled person should be aware that the general principles of the invention, as laid out in the claims, can be applied to different scenarios and in ways that are not explicitly described herein. Correspondingly, the following scenarios assumed for explanatory purposes of the various embodiments shall not limit the invention as such.

Figure 3:
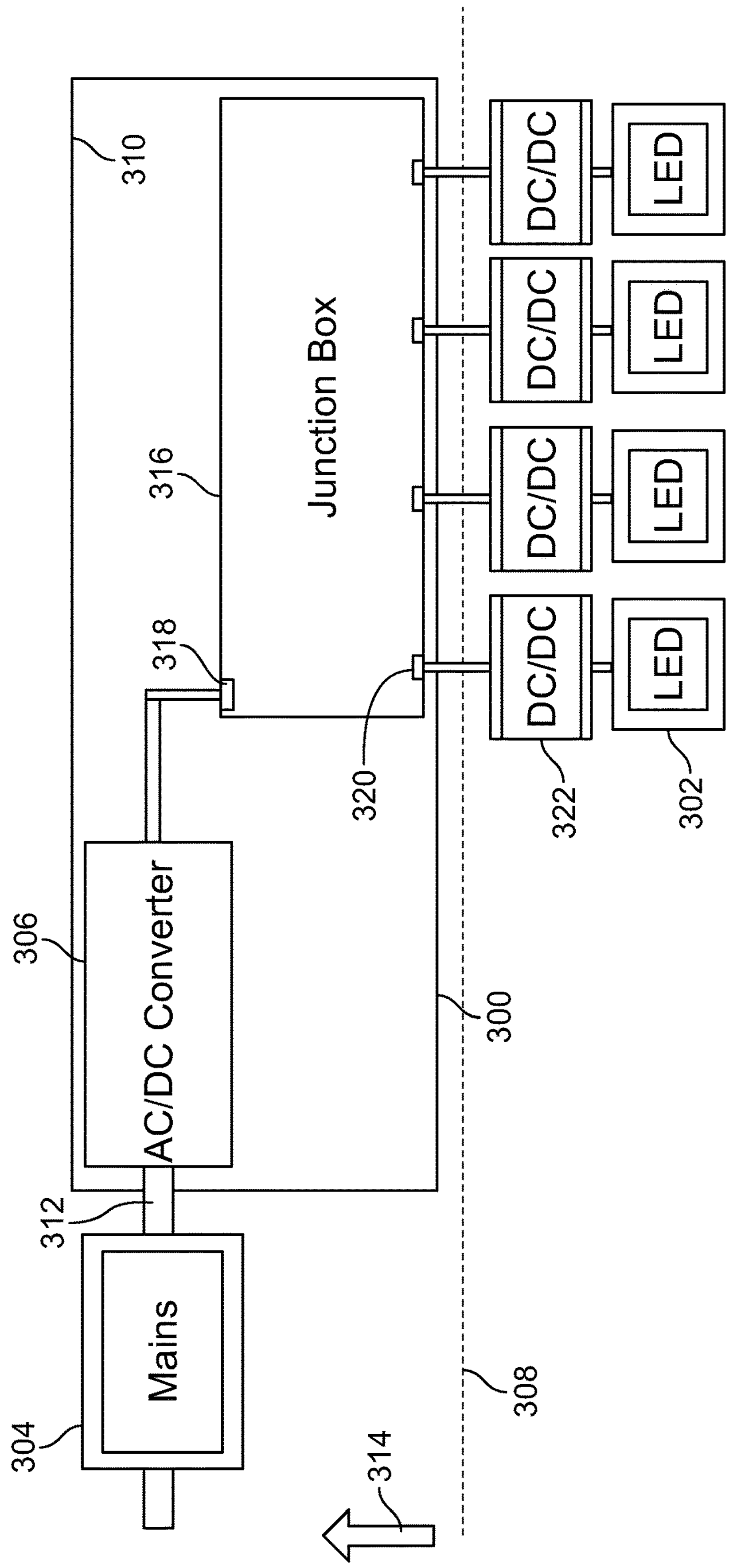
FIG. 3 shows an exemplary architecture of a DC low voltage power distribution system according to a first embodiment of the present invention.

FIG. 3 shows the DC low voltage distribution system 300 according to the first aspect of the present invention in the application environment of an LED lighting system. The DC low voltage distribution system 300 comprises an AC/DC converter 306 which is connected to mains power 304. According to the present invention, a DC low voltage power distribution unit 316 (which in the following will also be referred to as "distribution unit" or "junction box") is connected via an input connector 318 to an output of the AC/DC converter 306. The distribution unit 316 comprises a plurality of output connectors 320 each of which output a DC power compliant to UL class 2. According to the present invention, the DC power distribution unit 316 comprises an electric distribution circuit (not shown in this Figure) that distributes the input power from the input connector 318 to be output by the output connectors 320. The electric distribution circuit according to the present invention will be explained in more detail below with reference to FIG. 10.

The AC/DC converter 306 and the distribution unit 316 are fitted inside a regular UL class 1 type enclosure 310 which is arranged behind a partition wall or ceiling 308 or the like. As indicated by the arrow 314, all installations behind that partition wall 308 have to be installed by a qualified installer.

However, the LEDs 302 as well as converters 322 may be connected and exchanged without any further safety restrictions as all connections below separation line 308 are deemed safe for humans by UL Class 2 as well as SELV.

An armored cable or cable conduit 312 connects the AC/DC converter 306 to the mains voltage 304. According to the present invention, the AC/DC converter 306 may, for instance, be an SELV rated power supply which provides adequate isolation at its output, either in the form of double reinforced isolation or other.

According to the present invention, the output connectors 320 are chosen to be connected with readily available UL approved cable assemblies and/or junction boxes. As schematically shown in FIG. 3, a plurality of LEDs 302 is connected each to their separate DC/DC converter 322 for driving and control. As will become apparent from FIGS. 5 to 9, however, the output connectors 320 may of course be connected to any other DC load, such as USB converters for USB power delivery, cell phone chargers, laptops, printers, DECT phones, and the like, either directly or by means of a suitable DC/DC converter, depending on the application. Furthermore, splitters and bus bars also may be connected to the output connectors 320 to divide the maximum power as defined by UL class 2 over multiple loads.

Figure 1:
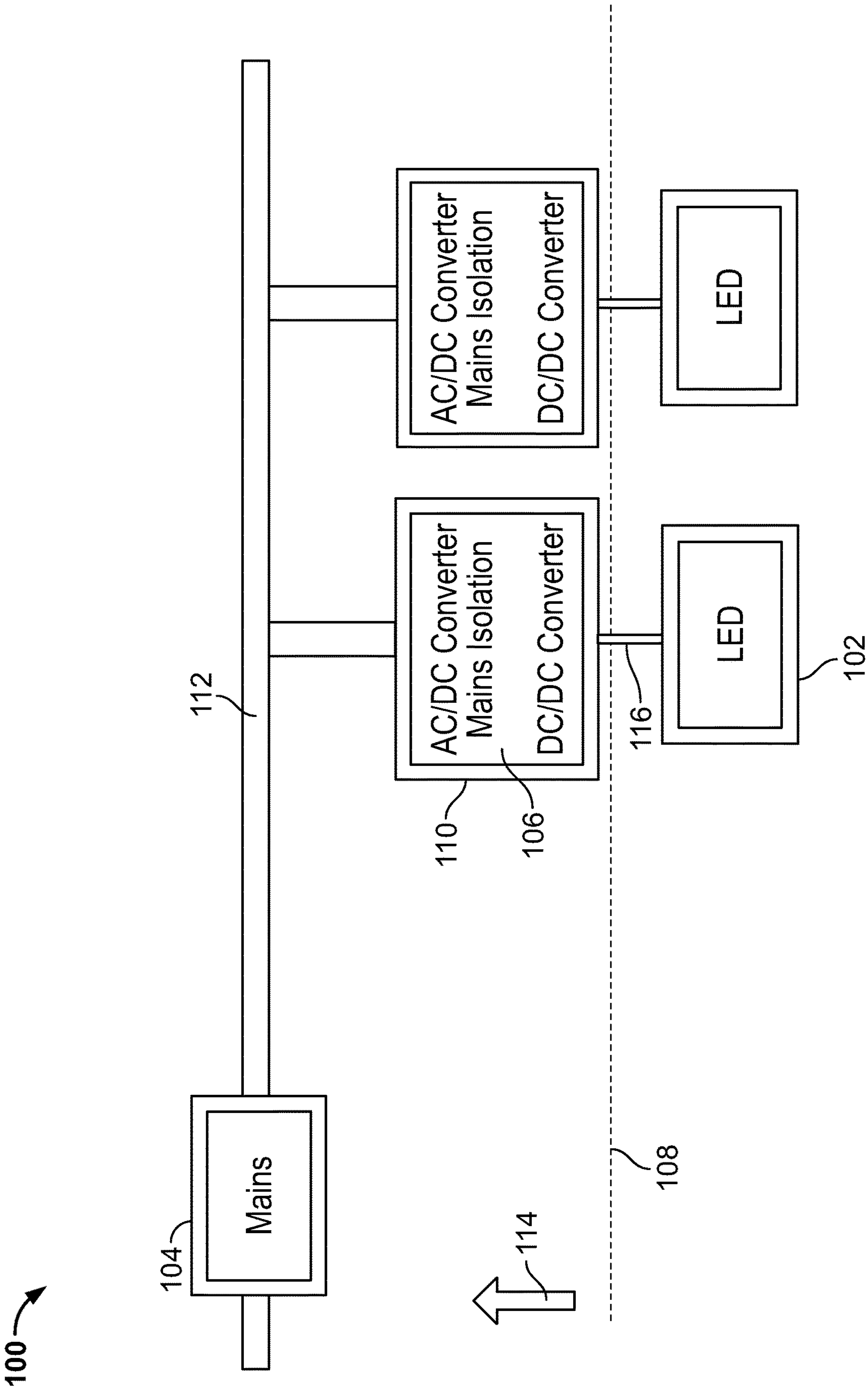
FIG. 1 shows an exemplary architecture of a conventional power distribution system as used in the US.
Figure 2:
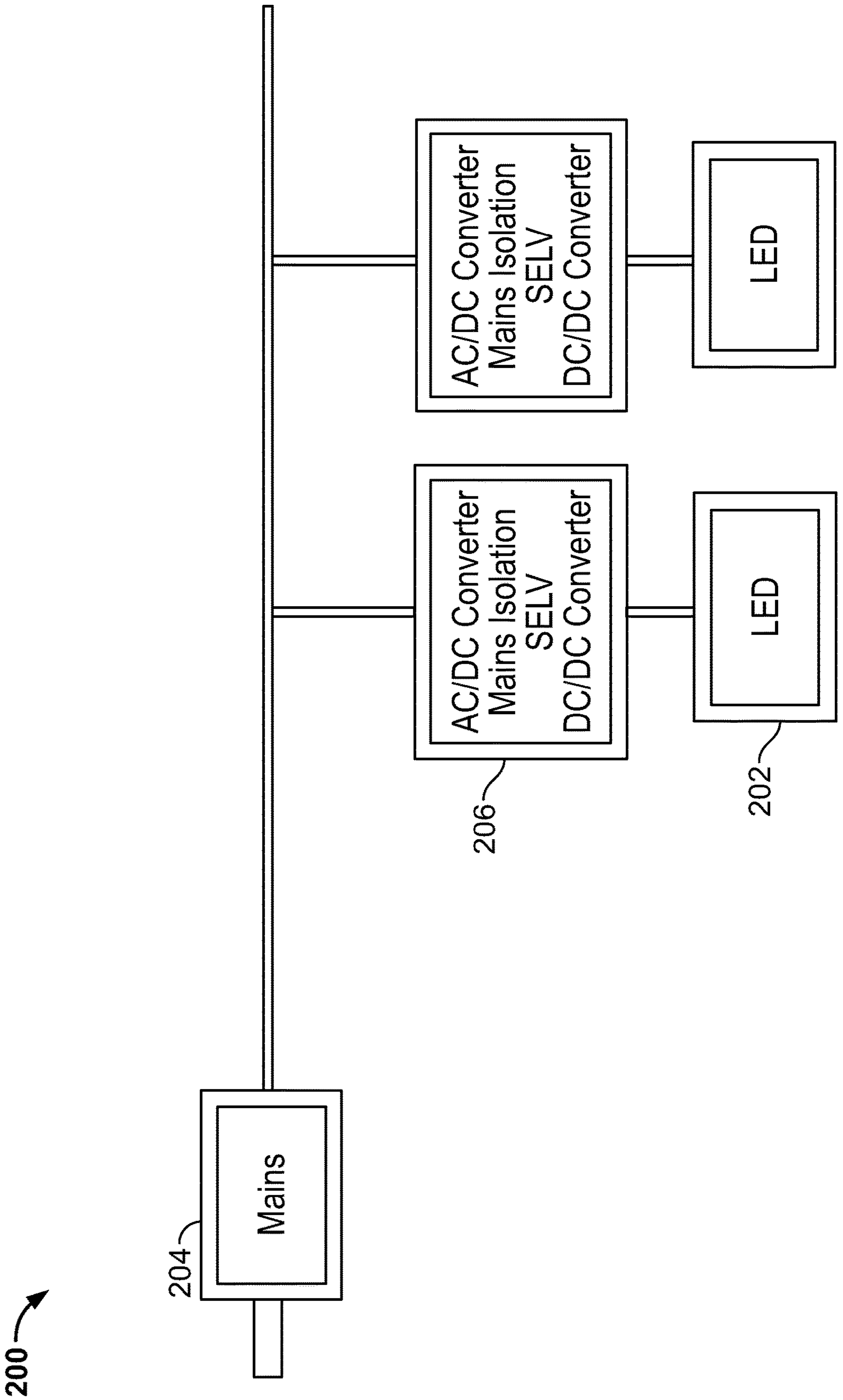
FIG. 2 shows an exemplary architecture of a conventional power distribution system as used in Europe.

Compared to FIG. 1, the distribution unit 316 reduces the amount of AC/DC converters which are needed to only one AC/DC converter 306. Moreover, the distribution unit 316 essentially performs a conversion of the lighting installation from being UL class 1 rated into being low voltage and UL class 2 compliant. Hence, the outputs 320 are inherently safe. The term "inherently safe" means that a minimum hazard is involved in normal or reasonably foreseeable use of a product, device, or process. This requirement is, for instance, fulfilled by class 2 rated power supplies that output a maximum voltage of 60 Vdc, a maximum current of 8 A, and a maximum power of 100 W, as defined by the current version of UL 1310. Other values may also be considered as inherently safe if the standard's requirements are changed.

Figure 4:
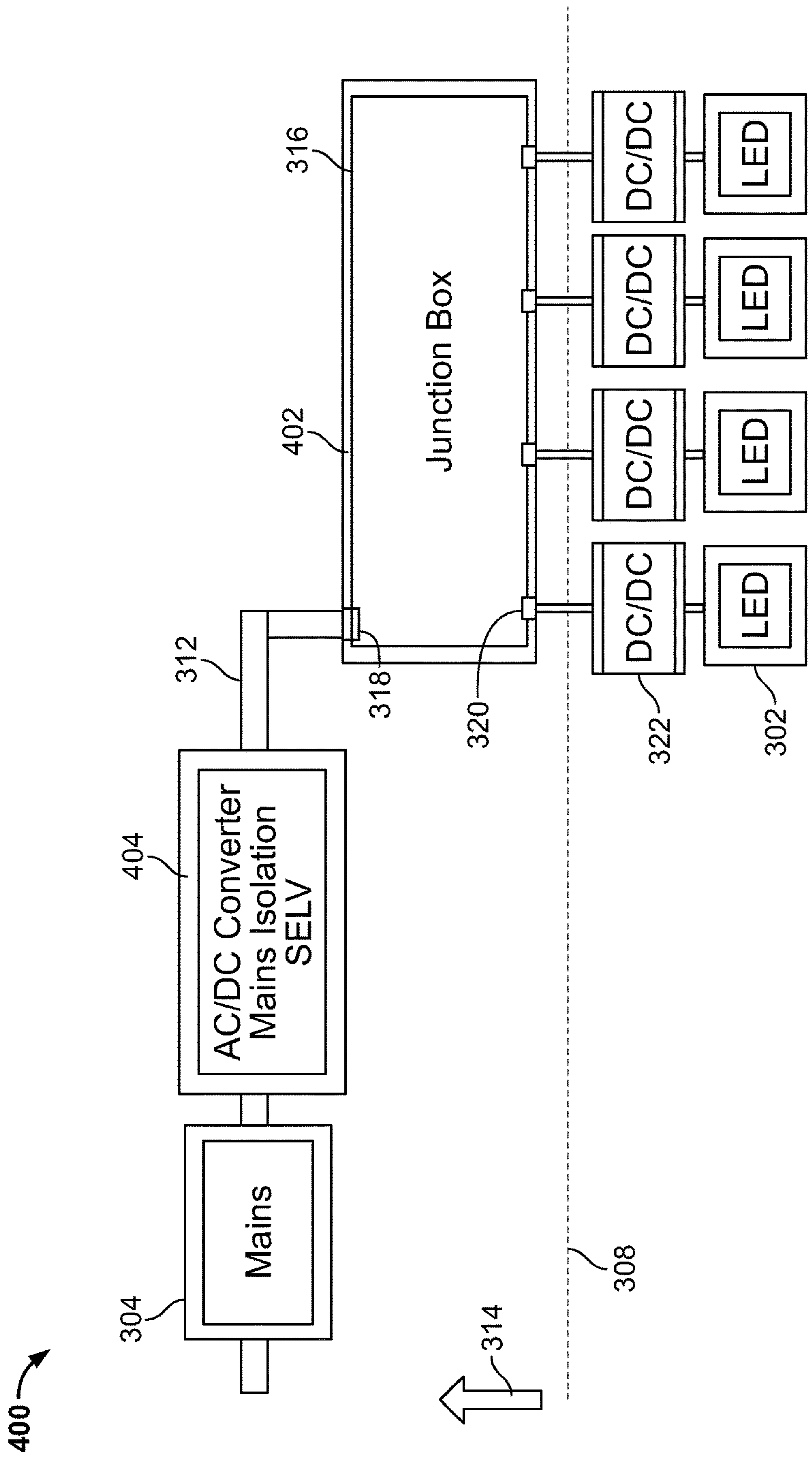
FIG. 4 shows an exemplary architecture of a DC low voltage power distribution system according to a second embodiment of the present invention.

FIG. 4 shows a DC low voltage power distribution system 400 according to a second aspect of the present invention. According to this embodiment, the distribution unit 316 is housed within an enclosure 402 that is compliant to UL class 1. The power supply which is formed by an AC/DC converter 404 is installed behind a partition wall 308 in the same way as any ballast or LED driver, and is arranged within a standard enclosure as required by UL class 1.

The distribution unit 316 is connected to the output of the power supply 404 by means of an armored cable or a cable conduit. Consequently, the enclosure 402 also has to comply with UL class 1 requirement, while the output connectors 320 comply with UL class 2. As indicated by the arrow 314, the armored cable (or the cable conduit) has to be installed by a qualified installer and may be connected with a terminal block 318.

A plurality of LEDs 302 with their drivers and control units (indicated by the DC/DC converters 322), are connected to the output connectors 320 in order to form a lighting system.

As in the first embodiment, the output connectors 320 output an inherently safe DC low voltage. Instead of providing power to the LEDs 302 these output connectors 320 can also be connected to other DC loads.

Figure 5:
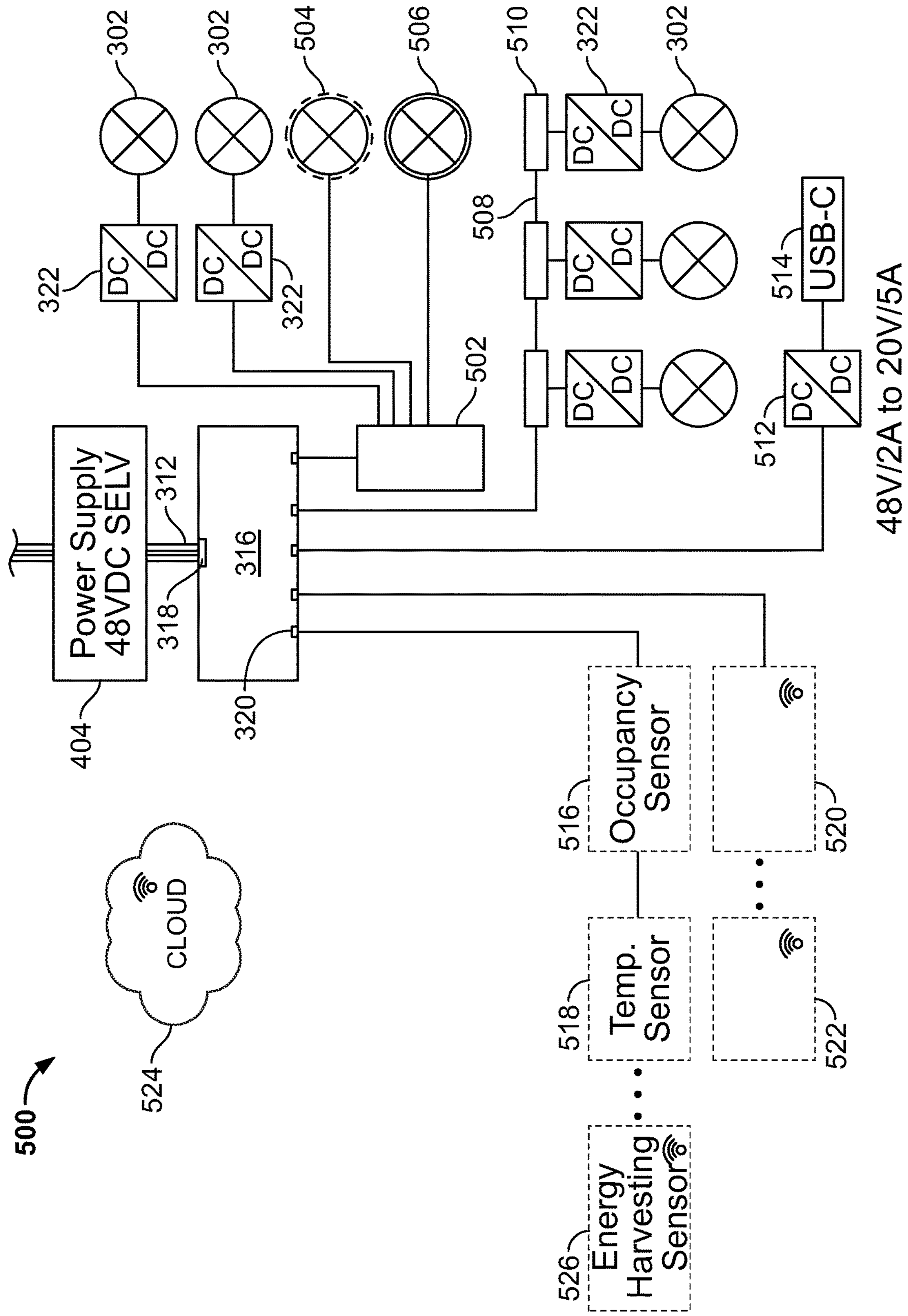
FIG. 5 shows an exemplary architecture of a DC low voltage power distribution system according to a further embodiment of the present invention.

FIG. 5 shows the application of the DC low voltage power distribution unit 316 according to the present invention in the application environment of a so-called LVDC (low voltage direct current) grid 500. The architecture of FIG. 5 is essentially based on the architecture shown in FIG. 4. In particular, a UL class 1 rated power supply 404 is connected to mains power (not visible in the FIG.). The output of the power supply 404 is connected by means of an armored cable or at cable conduit 312 to the input connector 318 of the distribution unit 316. Output connectors 320 provide an inherently safe output power that is rated according to UL class 2. According to the most recent version of UL1310, $6^{th}$ edition, Aug. 26, 2011, this means that the power which is output is limited to the maximum value of 100 VA and the current is limited to a maximum current of 8 A.

In contrast to the architecture shown in FIG. 4, not only single LEDs may be connected to these inherently safe output connectors 320. FIG. 5 schematically shows some alternative connection schemes. Firstly, an additional splitter 502 can be provided that is connected to one inherently safe output connector 320 in order to provide DC power to further LEDs 302 via respective DC/DC converters 322. Furthermore, also LEDs 504 with a smart socket can be connected either directly to one of the output connectors 320 or to the output of the splitter 502. As this is well known in the art, smart sockets are electronic units that allow the direct control of an LED, for instance, by means of a cell phone or the like.

Furthermore, also LEDs and/or LED holders 506 with integrated DC driver electronics may, of course, be used.

As shown in FIG. 5, the power distribution unit 316 may furthermore be connected to a bus bar 508 having a plurality of distribution nodes 510. Each distribution node 510 may be connected to a lighting unit comprising at DC/DC converter 322 and an LED 302.

The output connectors 320 of the power distribution unit 316 are also suitable for being connected to a DC/DC converter 512 which is configured for USB power delivery. The DC/DC converter 512 may, for instance, supply power to a USB-C device 514.

In addition to the above lighting and charging applications, any other DC loads can also be powered within the LVDC grid 500 according to the present invention. For instance, an occupancy sensor 516 and a temperature sensor 518 may be connected to one of the output connectors 320. Energy harvesting sensors 526 or any other kind of sensor may also be connected to the system.

Furthermore, also wireless communication bridges can be connected to one of the output connectors 320. For instance, a Wi-Fi to DALI bridge 520 can be provided for receiving control signals according to the DALI communication standard. Alternatively or additionally, a Zigbee, a Bluetooth bridge, or any other wireless communication bridge 522, may also be provided. The wireless communication may be performed via the Cloud 524, as this is generally known in the art. The protocols mentioned are examples and may also include low power Bluetooth, proprietary or open protocols.

Figure 6:
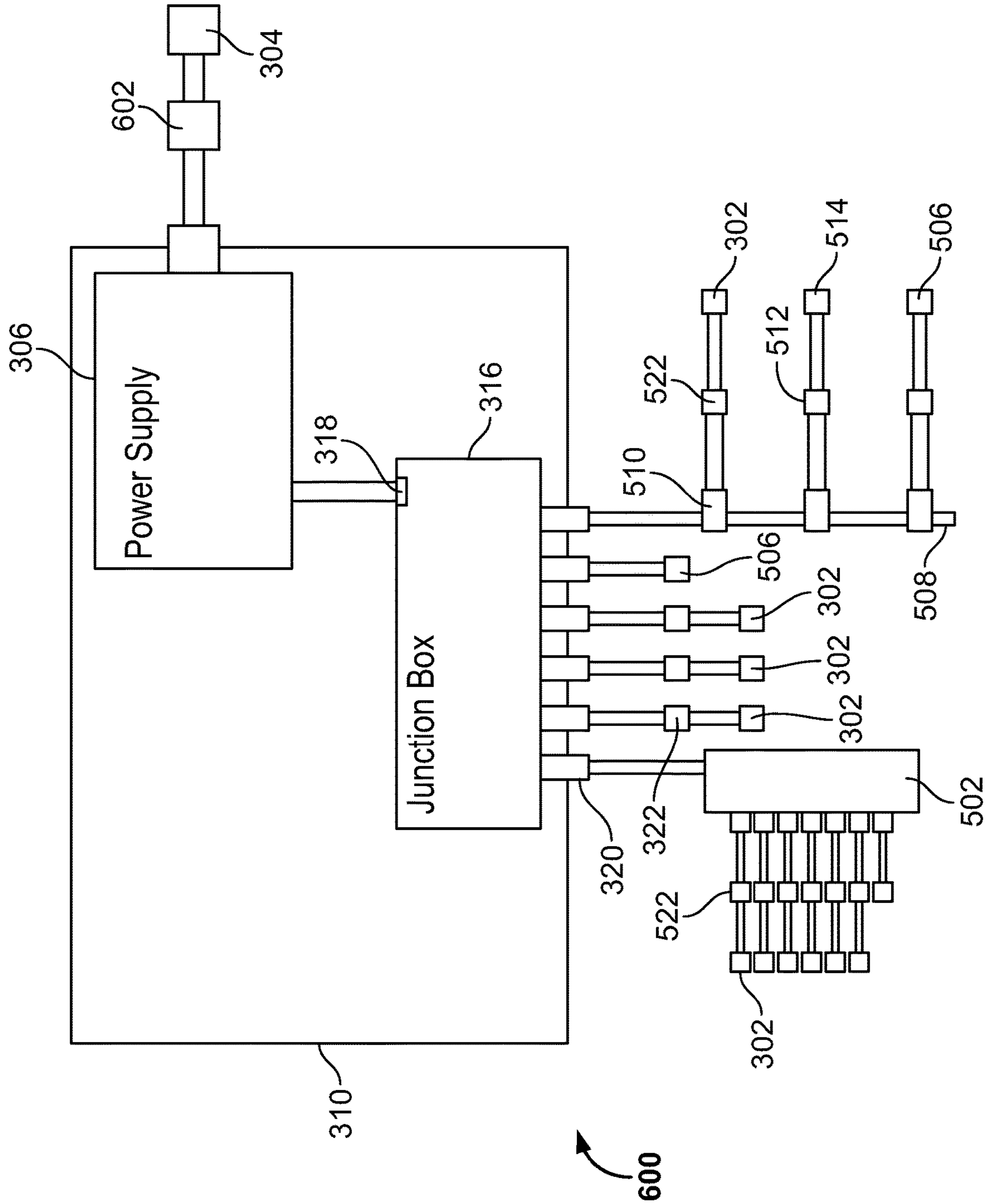
FIG. 6 shows an exemplary DC low voltage power distribution system according to a further embodiment.

FIG. 6 shows a further embodiment of a DC low voltage power distribution system 600 according to the present invention. According to this embodiment, a power supply 306 and a power distribution unit 316 are contained within a UL class 1 enclosure 310. The power supply 306 is connected to mains power 304 via an optional switch 602.

Output connectors 320 provide inherently safe DC low power to a plurality of DC load units. For instance, a bus bar 508 with a plurality of distribution nodes 510 may be connected to one of the output connectors 320. One of the load units connected to the distribution nodes 510 may, for instance, be a Zigbee controller 522 that is connected to an LED 302 or another DC load which is controlled by the wireless Zigbee controller 522.

Another DC load unit that may be connected to a distribution node 510 is a DC/DC converter 512 for a USB device 514. Furthermore, as already mentioned above with respect to FIG. 5, a DC load unit may comprise an integrated lighting fixture, such as an LED 506 with an integrated CV to CC driver. As already mentioned above, the LEDs 302 may, of course, also be coupled directly via their DC/DC converters 322 to one of the output connectors 320. Furthermore, FIG. 6 also shows a splitter 502, in particular a 6-way distributor, which is connected to one of the output connectors 320 as the DC load unit. Each of the outputs of this splitter 502 may, for instance, be connected to the CV to CC driver, forming a DC/DC converter 522 which in turn is connected to an LED 302.

Figure 7:
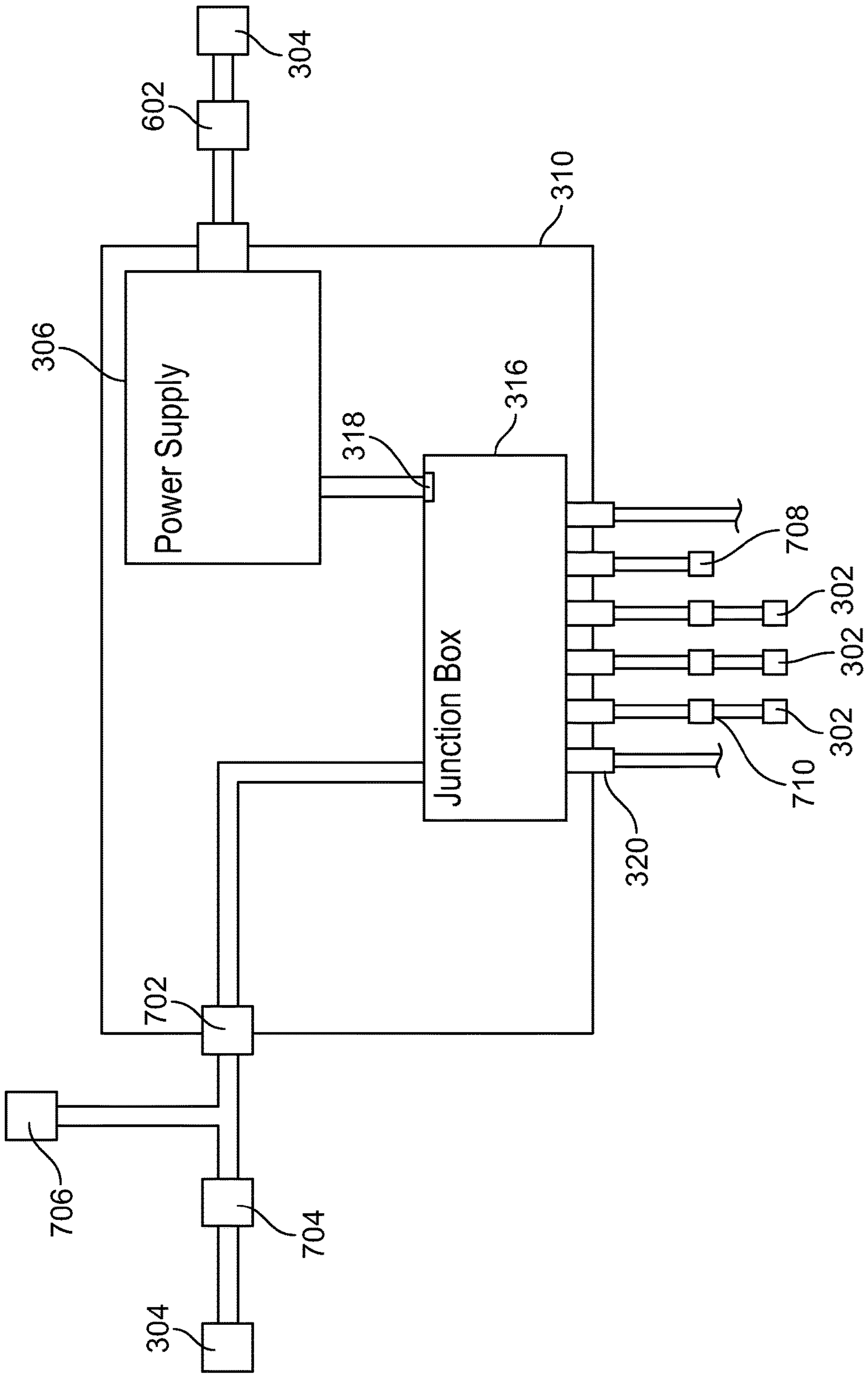
FIG. 7 shows an exemplary DC low voltage power distribution system according to a further embodiment.

FIG. 7 shows a further embodiment of a DC low voltage power distribution system 700 based on the arrangement of FIGS. 3 and 6. A power supply 306 which is connected via a switch 602 to mains power 304 is arranged together with the distribution unit 316 within an enclosure 310 (rated UL class 1).

The output connectors 320 can be connected to similar DC load units as shown in the previous Figures. In addition to the architecture of FIG. 6, the distribution unit 316 further comprises a DALI connector 702 for connecting a DALI controller 704 to the distribution unit 316. This DALI controller 704 is powered by mains power 304 and can be accessed by a user interface 706 such as a switch, dimmer, or the like.

DALI (digital addressable lighting interface) is a data protocol and transport mechanism that was jointly developed and specified by several manufacturers of lighting equipment. The common platform of DALI enables equipment from different manufacturers to be connected together. Usually, a DALI network consists of a controller and lighting devices that have DALI interfaces. The controller 704 monitors and controls each light by means of a bidirectional data exchange. The DALI protocol permits devices to be individually addressed and controlled. DALI requires a single pair of wires to form the bus for communication to all devices on the DALI network. The DALI system is not classified as SELV and, therefore, may be run next to the mains cable or within a multicore cable that includes mains power. A DALI network requires a 24 V DC 250 mA power supply to operate.

According to the present invention, a DALI controllable LED module 708 is connected to at least one of the output connectors 320. Alternatively, also conventional LEDs 302 can be connected to a DALI LED controller 710.

Figure 8:
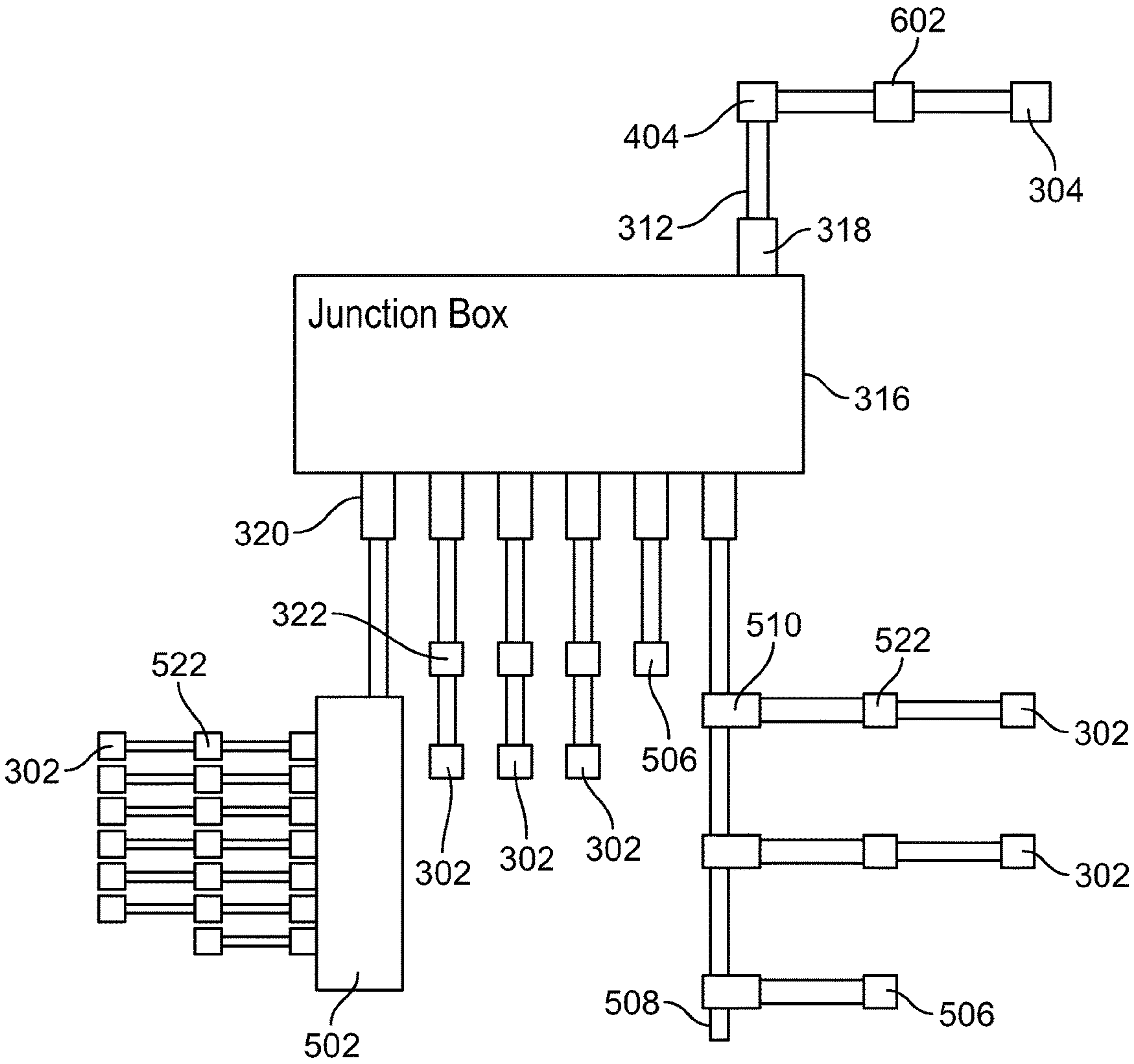
FIG. 8 shows an exemplary DC low voltage power distribution system according to a further embodiment.

FIG. 8 shows an architecture which is based on the concept of FIG. 4 where an armored cable or cable conduit 312 is connected to the input connector 318 of the distribution unit 316. An SELV power supply 404 outputs an output voltage of 60 V DC maximum to the distribution unit 316. The power supply 404 is connected via a power supply switch 602 to mains power 304. The DC load units that can be connected to the various output connectors 320 essentially correspond to those explained with reference to FIG. 6. The respective explanations will not be reiterated here.

Figure 9:
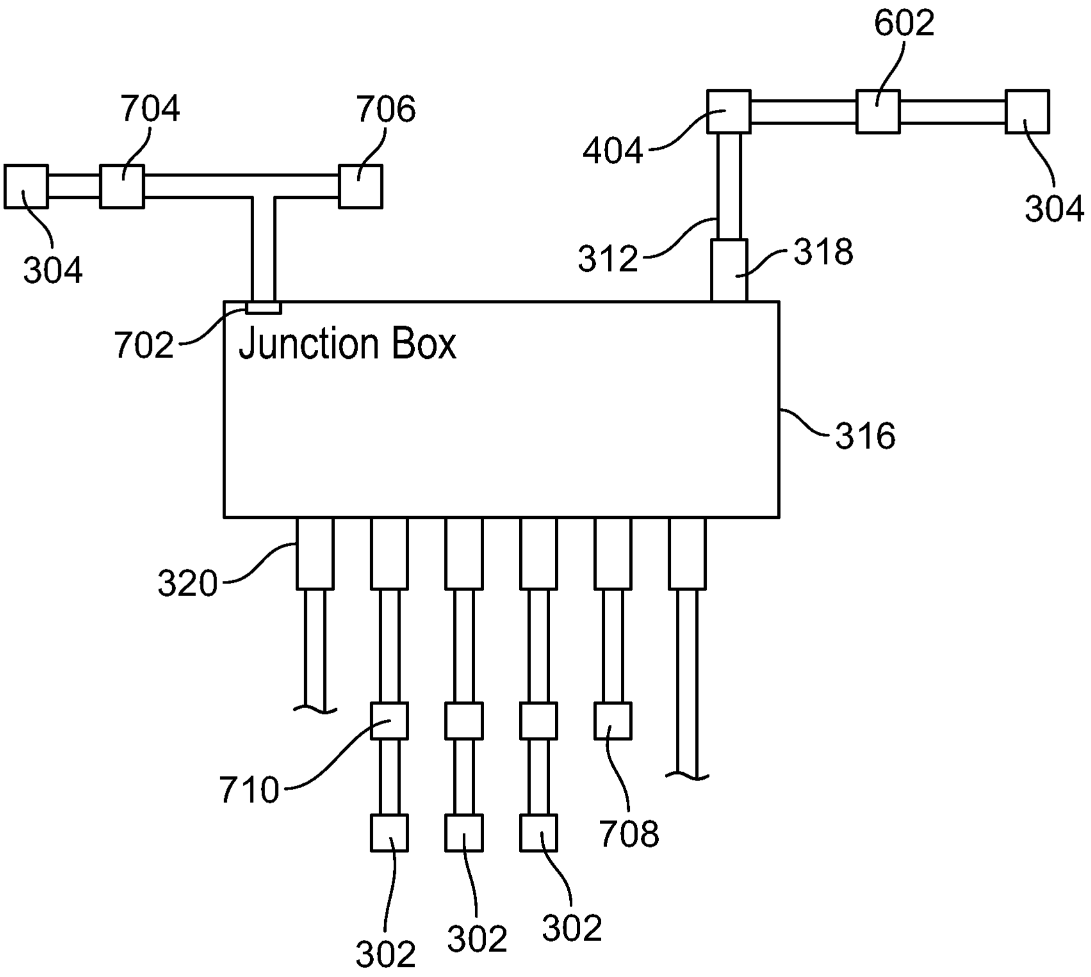
FIG. 9 shows an exemplary DC low voltage power distribution system according to a further embodiment.

The arrangement of FIG. 8 can be further extended in order to provide DALI functionality. Such an architecture is shown in FIG. 9. The distribution unit 316 does not only have an input connector 318 for being connected to an armored cable or cable conduit 312, but also has a DALI connector 702 that provides the connection to the user interface 706 and the DALI controller 704. As explained with reference to FIG. 7, the DALI controller 704 is connected to mains power 304.

The armored cable or cable conduit 312 connects the input connected 318 to power supply 404 which, in turn, is connected via the switch 602 to mains power 304. As already mentioned with respect to FIG. 7, one or more DALI LED controllers 710 and/or DALI controllable LED modules 708 are connected to the output connectors 320 of the distribution unit 316.

Figure 10:
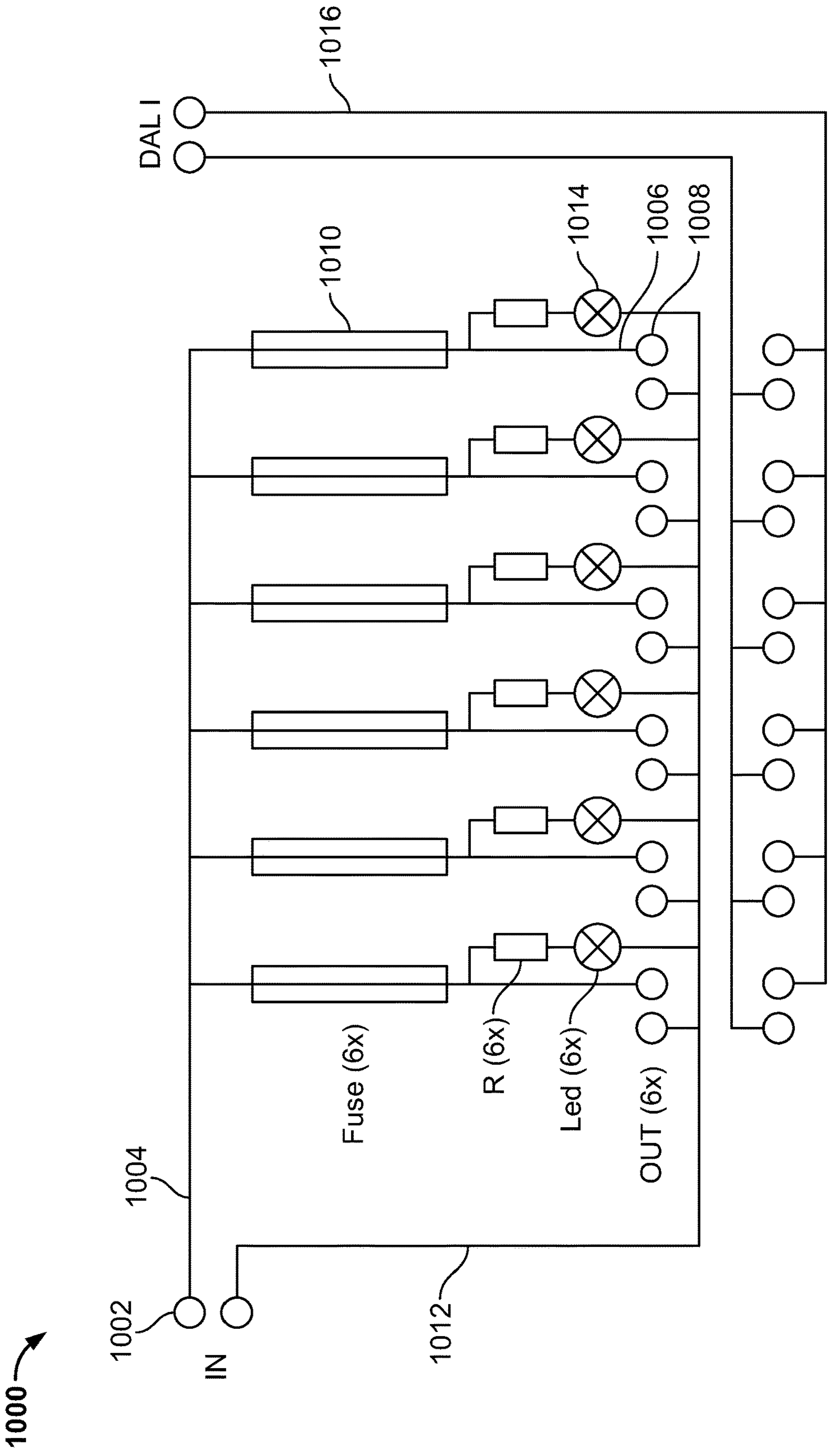
FIG. 10 shows an exemplary embodiment of a circuit diagram of the electric distribution circuit.

According to the present invention, the DC power distribution unit 316 comprises an electric distribution circuit that distributes the input power from the input connector 318 to be output by the output connectors 320. FIG. 10 illustrates such a distribution circuit 1000 according to the present invention. As shown in FIG. 10, the electric distribution circuit 1000 comprises two input terminals 1002 for being connected to the input connector 318. An input line 1004 (which is, for instance, connected to positive potential) branches off into a plurality of output lines 1006 with output terminals 1008 that are connected to the output connectors 320.

According to the present invention, each of the output lines 1006 is provided with current limiting means 1010 which ensure that the power provided at the output terminals stays within the limits of UL class 2. In particular, it must be ensured that the current does not exceed 8 A as specified by UL1310. The current limiting means 1010 may, for instance, comprise glass fuses, thermal fuses, automatic fuses, or electric circuits that are designed to limit the output current and power.

In order to be able to monitor the status of the current limiting means 1010, each output line 1006 is connected via a resistor and a signaling LED 1014 to the reference line 1012. In case the fuse 1010 has been destroyed, the signaling LED 1014 is no longer powered and, therefore, does not emit light. It is clear for a person skilled in the art, however, that any other suitable signaling means can also be used for monitoring the status of the current limiting means 1010.

According to the embodiment shown in FIG. 10, the electric distribution circuit 1000 also comprises the two wires 1016 that are necessary for a DALI control according to the embodiment of FIGS. 7 and 9.

Figure 11:
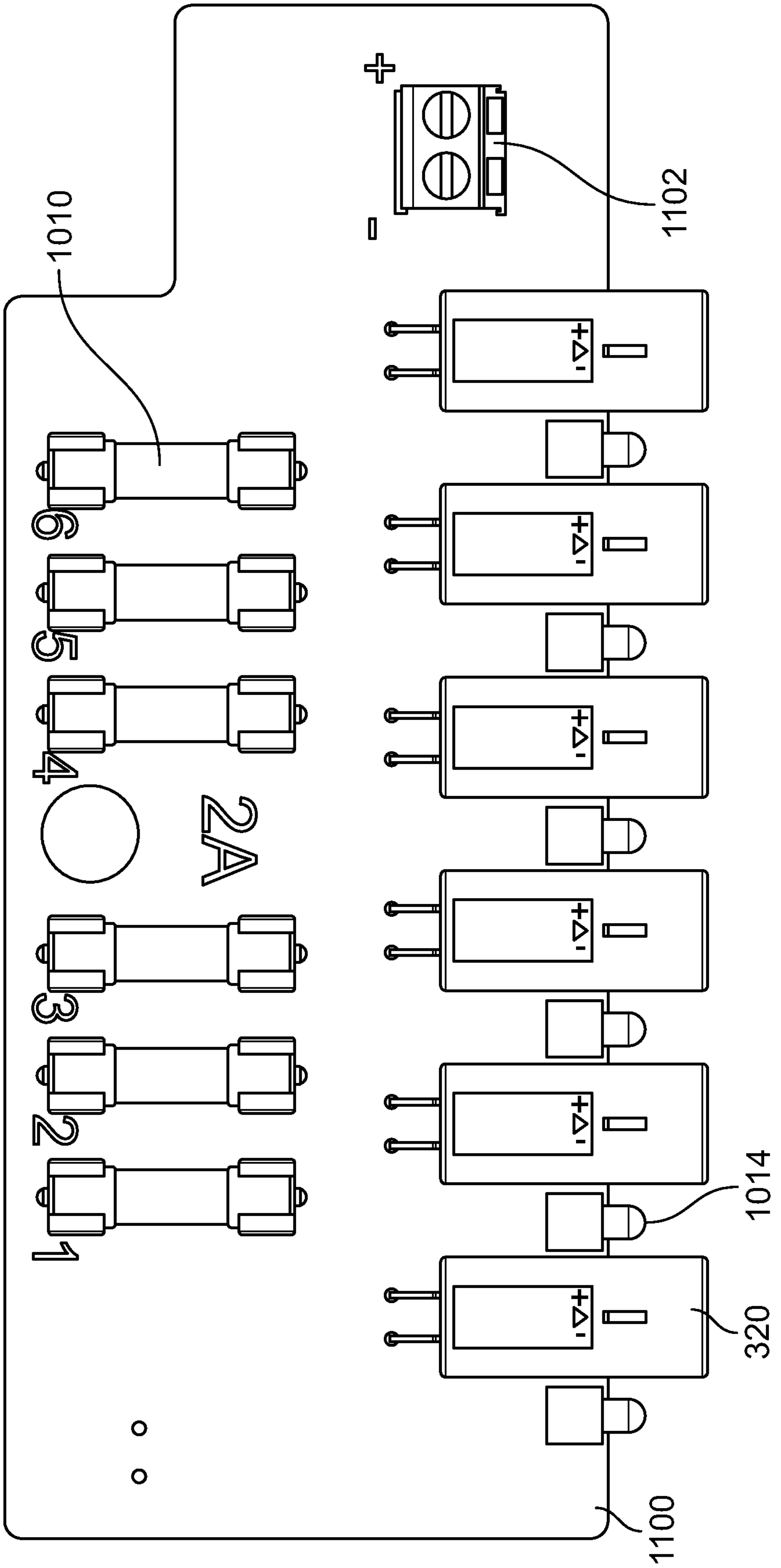
FIG. 11 shows an exemplary electric distribution circuit according to a first embodiment.

FIG. 11 shows an example of a printed circuit board (PCB) 1100 realizing the electric distribution circuit 1000. The output connectors 320 are formed by conventional PCB connectors. Glass fuses form the current limiting means 1010. A terminal block 1102 is provided for connecting the input connector 318. A plurality of signaling LEDs 1014 are arranged in a way that they can stay visible when mounting the printed circuit board 1100 in a housing (not shown in the Figures).

Furthermore, the fuses 1010 are arranged in a way that they are accessible for a facilitated exchange in case of a fault.

Figure 12:
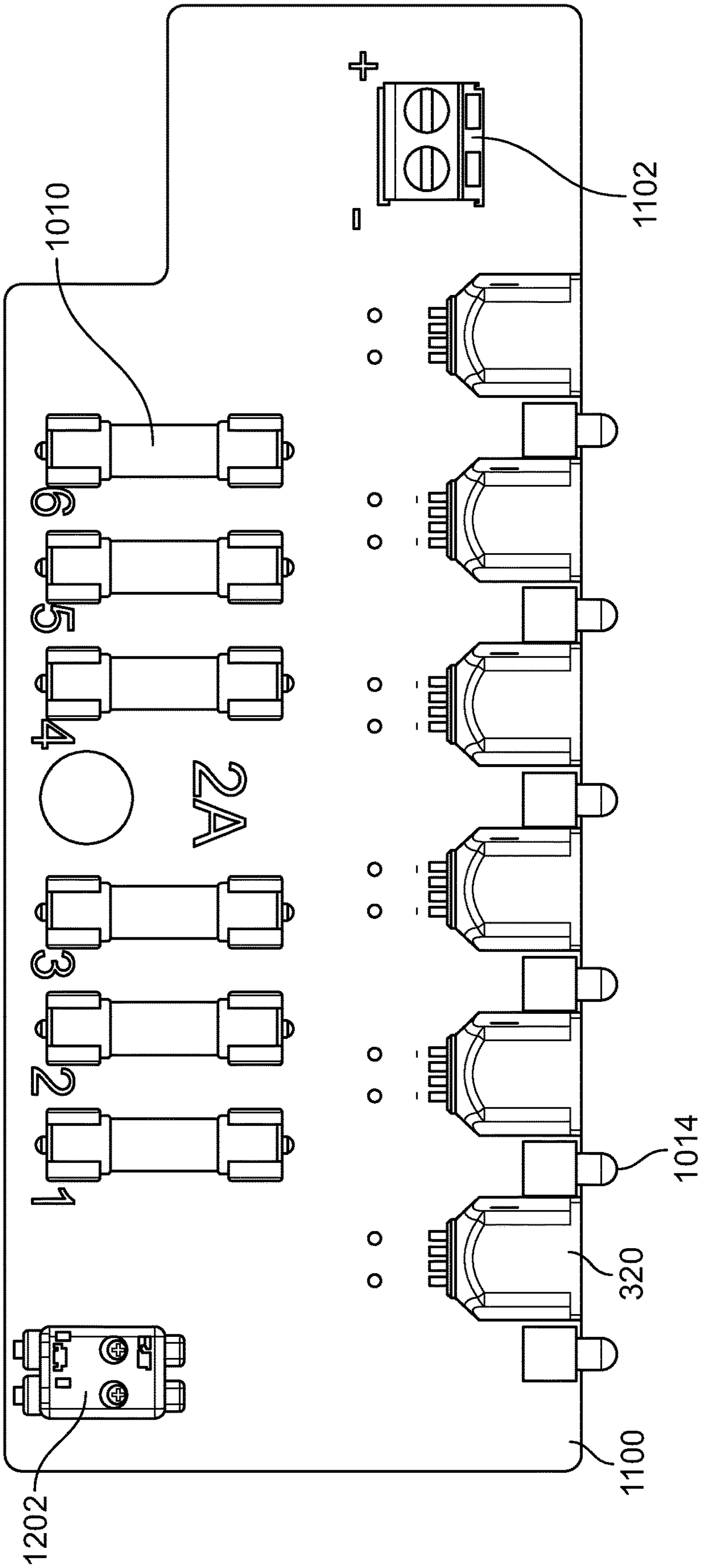
FIG. 12 shows an exemplary electric distribution circuit according to a second embodiment.

FIG. 12 shows the embodiment of a printed circuit board forming the electric distribution circuit 1000. According to this embodiment, surface mount technology is used for attaching the output connector to the PCB. Moreover, a DALI connector 1202 is provided for attaching the DALI wires. The other components correspond to those shown in FIG. 11.

As mentioned above, the present invention provides a DC low voltage power distribution unit for a power grid preferably for a building, the DC low voltage power distribution unit comprising at least one input connector for connecting the power distribution unit to a DC power supply, an electric distribution circuit comprising an input line connected to said input connector, and a reference potential line, the input line branching off into a plurality of output lines, the electric distribution circuit comprising current limiting means in each of the output lines, wherein a current limit value is provided by the current limiting means to limit an output power to be output at each of the output lines to an inherently safe value; and a plurality of output connectors connected to the output lines and to the reference potential line, wherein each of the output connectors are configured for outputting low DC voltage to a DC load.

The present invention is based on the idea that by limiting the output power to an inherently safe value, the DC low voltage power distribution unit can serve as a converter between UL class 2 which has to be complied with at the output towards the lighting units and UL class 1 which has to be met by the mains installations. In particular, UL1310 presently requires that the output power is limited to 100 VA and the maximum current is limited to 8 A.

The following Table 1 compares the requirements regarding maximum voltage, isolation, maximum current, and maximum power for the various standards mentioned above and the system according to an exemplary aspect of the present invention.

TABLE 1

| | SELV (IEC) | UL class 2 | EMerge Alliance | LVDC of this invention | USB-C |
|---|---|---|---|---|---|
| Voltage (max) | 60 Vdc | 60 Vdc | 24 Vdc | 48 Vdc | 20 Vdc |
| Isolation | double reinforced | double reinforced | double reinforced | double reinforced | double reinforced |
| Current (max) | N/A | 8 A | 4.1 A | 2 A (fused) | 5 A |
| Power (max) | N/A | 100 W | 100 W | appr. 100 W | 100 W |

As can be seen from this overview, the DC low voltage distribution system according to the present invention can be designed in a way that it meets all existing requirements mentioned above.

An advantage of the architecture according to the present invention can be seen in the fact that any off-the-shelf SELV rated power supply, or power supply not specified as SELV but with similar performance with respect to output voltage and isolation class as SELV, can be converted into a plurality of UL class 2 rated outputs in a cost efficient and flexible way. Based on the fact that many off-the-shelf power supplies can be used, this invention makes use of commercially and globally available components and only adds functionality to ensure that all outputs are UL class 2 compliant.

The resulting outputs can be used in either EMerge Alliance compliant installations or in any other UL class 2 installations. Every output can be used to power one or more low-voltage lighting fixtures up to the limits as set forth by UL class 2. Moreover, as LVDC is taking off in more areas than just lighting, the present invention also aims at powering non-lighting devices, such as USB-C (USB-PD) over the output of a simple and compact DC/DC converter. The resulting power distribution network can be used for powering a vast array of sensors, switches, and gateways (i. e., to convert Wi-Fi into the Zigbee or Zigbee into DALI) because DC/DC conversion is often cheaper, smaller and more efficient than AC/DC conversion. Therefore, the LVDC network is more flexible and lower in installation costs than known networks such as the one proposed by the EMerge Alliance.

According to an advantageous embodiment, the current limiting means comprise at least one glass fuse, thermal fuse, or automatic fuse or a circuit designed to limit the output current and power. Essentially, any type of fuse or current limiting circuitry can be used for limiting the current in the DC low voltage power distribution unit according to the present invention. Glass fuses have the advantage that they are cheap, small, simple to install, and fast. However, they have to be replaced if they have become defective due to overloading or short-circuiting. Consequently, automatic fuses, such as magneto-thermal fuses, can be used which have the advantage that they can be re-activated after a fault. Furthermore, polymeric positive temperature coefficient fuses can be advantageously used as resettable fuses. It is clear for a person skilled in the art that any kind of single tripping or resettable fuses can advantageously be employed in the DC low voltage distribution unit according to the present invention. Moreover, the current limiting means can also be configured in a way that the current limit value provided by the current limiting means is adjustable. In particular, this value can be adjusted according to the actual requirements of a standard if these requirements are changed without much effort.

According to another embodiment, the input connector is configured to be connected to a power supply with a voltage limited to a specified low voltage and with specified safety isolation. In particular, the input connector may be connected to a power supply with a voltage limited to the UL1310 specified voltage as well as the safety isolation as specified by UL 1310. Such power supply devices are commonly known as safety extra low voltage (SELV) AC/DC converters. However, as the basic function of this power supply can be seen in the voltage limitation and the isolation requirements, non-SELV rated power supplies could also be compliant.

Moreover, the input connector may be configured to be connected to an armored cable or a cable conduit. This solution is advantageous for an embodiment where the DC low voltage power distribution unit is directly connected to a power supply that has to comply with UL class 1. In case that the DC low voltage power distribution unit is supplied from an AC/DC converter which is integrated in a common UL class 1 enclosure, the interconnection between the AC/DC converter and the distribution unit does not have to meet the requirements of UL class 1. Consequently, the input connector does not have to be connectable to an armored cable or cable conduit.

In order to facilitate maintenance and repair of the DC low voltage power distribution system, signaling means may be provided for indicating a status of the current limiting means. These signaling means may comprise a plurality of light emitting diodes (LED), each being connected between the current limiting means and the output connector, for optically indicating said status. Such LEDs are cheap to be installed and effective for identifying a defective fuse. However, of course, other than optical signaling means may also be provided. In particular, a communication signal can also be sent to a controller, if the DC low voltage power distribution unit is equipped with a communication bus, such as a DALI communication bus.

By providing a communication bus line at the electric distribution circuit for being connected to a lighting interface controller, the DC low voltage power distribution unit according to the present invention can be integrated into a communication network that allows a central control of DC loads, such as lighting units.

According to an advantageous embodiment of the present invention, a DC low voltage power distribution system further comprises a plurality of DC load units that are connected with the output connectors via mating load connectors. Such DC load units may preferably be attached to the DC low voltage power distribution unit by means of plug connectors. Thereby a flexible architecture can be achieved easily. In particular, the DC load units may comprise lighting units, such as LED luminaires or power converting units for powering a DC load. For instance, a USB converter can be provided which is configured for USB power delivery. The DC load units according to the present invention may, of course, interface any other DC load, including cell phones to be charged, laptops, printers, or DECT phones to be powered.

Furthermore, in order to still enhance the flexibility of the system architecture, the system according to the present invention may further comprise at least one splitter and/or bus bar for further distributing the DC power output at the output connectors.

The DC low voltage power distribution system according to the present invention may advantageously be configured to be mounted at a ceiling, a wall, or other part of building installation of the building. Of course, the DC low voltage power distribution system according to the present invention may also be mounted behind pieces of furniture such as kitchen cupboards or partition walls for office desks.

The present invention has been described above with reference to installations in the US. However, for a person skilled in the art it is clear that the system according to the present invention is also applicable for Europe and the rest of the world, even if there is no need for armored cables or cable conduits carrying the mains power.

It should be further noted that the individual features of the different embodiments of the invention may individually or in arbitrary combination be subject matter to another invention.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A DC low voltage power distribution unit for a power grid, the DC low voltage power distribution unit comprising:

an input connector connecting the DC low voltage power distribution unit to a DC power supply, the DC power supply has a voltage limited to a specified low voltage with a specified safety isolation;

an electric distribution circuit having:

(a) an input line:

(1) connected to the input connector and a reference potential line, and (2) branching off into a plurality of output lines, and (b) current limiting means in each of the output lines to limit an output power at each of the output lines to an inherently safe value, and (c) a plurality of output connectors connected to the output lines and to the reference potential line;

whereby the output connectors output low DC voltage to a plurality of different DC loads external to the DC low voltage power distribution unit.

2. A DC low voltage power distribution unit according to claim 1, wherein each of the current limiting means have at least one of a glass fuse, a thermal fuse, and an automatic fuse or a circuit designed to limit the output current and power.

3. A DC low voltage power distribution unit according to claim 1, wherein the input connector is connected to an armored cable or a cable conduit.

4. A DC low voltage power distribution unit according to claim 1, further including signaling means for indicating a status of the current limiting means.

5. A DC low voltage power distribution unit according to claim 4, wherein the signaling means include a plurality of light emitting diodes with each light emitting diode connected between the current limiting means and the output connector for optically indicating said status.

6. A DC low voltage power distribution unit according to claim 5:

(a) further including a lighting interface controller, and (b) wherein the electric distribution circuit further includes a communication bus line connected to the lighting interface controller.

7. A DC low voltage power distribution unit according to claim 1, further comprising an enclosure containing the electric distribution circuit and separating the electric distribution circuit including the current limiting means from the DC loads.

8. A DC low voltage power distribution unit according to claim 7, wherein the enclosure is a UL class 1 enclosure.

9. A DC low voltage power distribution system for a power grid, the DC low voltage power distribution system connected to a mains voltage and having a DC low voltage power distribution unit for a power grid comprising:

an input connector connecting the DC low voltage power distribution unit to a DC power supply;

an electric distribution circuit having:

(a) an input line:

(1) connected to the input connector and a reference potential line, and (2) branching off into a plurality of output lines, and (b) current limiting means in each of the output lines to limit an output power to be output at each of the output lines to an inherently safe value; and (c) a plurality of output connectors connected to the output lines and to the reference potential line;

an AC/DC converter for converting a mains voltage into a safety extra low voltage SELV, the input connector is connected to the SELV AC/DC converter; and a plurality of different DC load units connected with the output connectors via mating load connectors, the output connectors outputting low DC voltage to the DC load units external to the DC low voltage power distribution unit.

10. A DC low voltage power distribution system according to claim 9, wherein at least one of the DC load units comprises at least one lighting unit.

11. A DC low voltage power distribution system according to claim 10, wherein at least one of the DC load units has a power converting unit for powering a DC load.

12. A DC low voltage power distribution system according to claim 11 further including at least one splitter and/or bus bar for further distributing the DC power output at the output connectors.

13. A DC low voltage power distribution system according to claim 12, wherein the electric distribution circuit further includes a communication bus line connected to a lighting interface controller.

14. A DC low voltage power distribution system according to claim 13, wherein the system is mounted at a ceiling, a wall, or other part of building installation of the building.

15. A DC low voltage power distribution system according to claim 14, wherein the ceiling, the wall, or other part of the building installation of the building is disposed between the current limiting means and the DC loads.

16. A DC low voltage power distribution system according to claim 9, further comprising an enclosure containing the electric distribution circuit and separating the electric distribution circuit including the current limiting means from the DC loads.

17. A DC low voltage power distribution system according to claim 16, wherein the AC/DC converter is contained within the enclosure.

* * * * *